United States Patent [19]

Ramsay et al.

[11] 3,813,489

[45] May 28, 1974

[54] LOW LIGHT TELEVISION CAMERA

[75] Inventors: Melvin Murray Ramsay, Broxbourne; William Geddes Barnes; Michael Albert Bedgood, both of Harlow, all of England

[73] Assignee: International Standard Electric Corporation, New York, N.Y.

[22] Filed: Nov. 3, 1972

[21] Appl. No.: 303,554

[30] Foreign Application Priority Data

Nov. 23, 1971 Great Britain .................. 54291/71

[52] U.S. Cl. ................ 178/7.2, 250/213 VT, 315/3

[51] Int. Cl. .............................................. H04n 5/34

[58] Field of Search ........................ 178/7.2, DIG. 2; 250/213 R, 213 VT; 315/3

[56] References Cited

UNITED STATES PATENTS 3,341,655 9/1967 Vilkomerson ........................ 178/7.2

*Primary Examiner*—Robert L. Richardson
*Attorney, Agent, or Firm*—John T. O'Halloran; Menotti J. Lombardi, Jr.; Edward Goldberg

[57] ABSTRACT

The phosphor screen of an image intensifier fiber-optically coupled to the target of a television camera tube is connected to a point in the video amplifier which provides a signal to decouple the target from ground. The phosphor acts as a guard ring to avoid capacitive effects. The feedback signal from the amplifier is equal in magnitude and phase to the voltage signal produced at the target. An added guard ring may be connected to the same potential as the phosphor.

3 Claims, 1 Drawing Figure

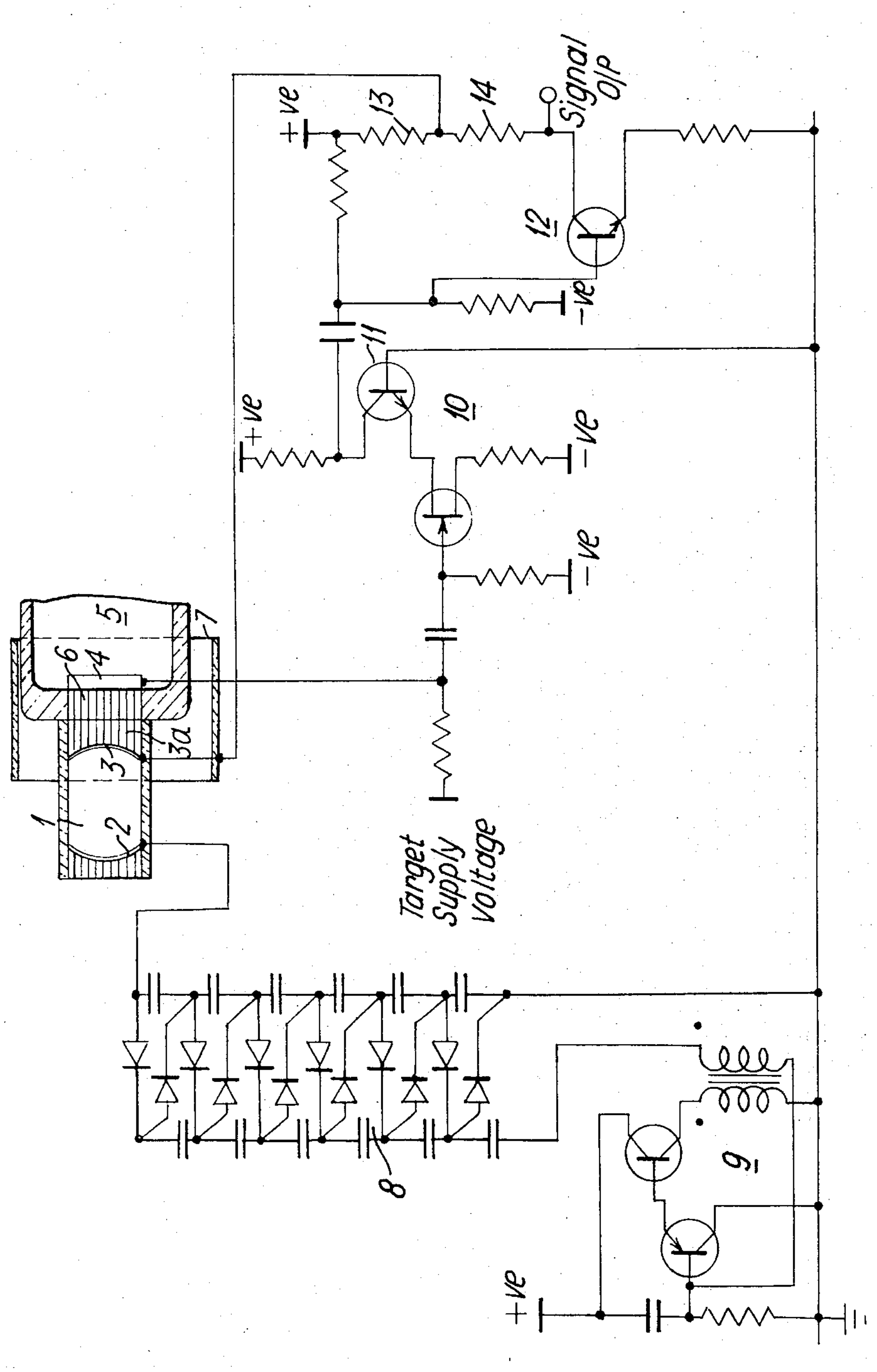
Signal O/P
+ve
-ve
Target Supply Voltage
1
2
3
3a
4
5
6
7
8
9
10
11
12
13
14

LOW LIGHT TELEVISION CAMERA

BACKGROUND OF THE INVENTION

1. Field of the Invention

This invention relates to low light level television cameras, and in particular to cameras having a photoconductive target fiber optically coupled to the phosphor of an image intensifier.

2. Description of the Prior Art

The coupling of the light output of the phosphor of an image intensifier stage to a photosensitive surface, such as the photocathode of a second image intensifier stage, or the target of a television camera tube such as a vidicon, is achieved with particular efficiency fiber-optically. Normally fiber optic plates are not able to withstand large potential differences across their ends, and so it is common practice to arrange the power supply to the image intensifier so that the output phosphor is at ground potential while its photocathode is held at a large negative potential.

It is found however that when an image intensifier, whose phosphor is held at ground potential, is fiber-optically coupled to the photoconductive target of a television camera tube, the performance of the camera tube tends to be adversely affected. One reason is that the coupling provides a ground plane a short distance in front of the target thereby greatly increasing it capacitance to ground which limits high frequency response. A second reason is that the close proximity of the image intensifier, which is powered from an oscillator via a voltage multiplier, introduces problems of pick-up.

The problem of impaired resolution resulting from the target having excessive capacitance to ground has previously been encountered in cameras not incorporating an image intensifier, and there are two established techniques for alleviating this problem.

One of these techniques involves coupling the target capacitance and the input capacitance of the video amplifier with a small inductance to form a $\pi$-filter. This filter, with proper adjustment of component values, can considerably extend the high frequency performance of the camera. Obviously such a filter could be redesigned to take account of the increased capacitance presented by the introduction of an image intensifier into close proximity with the target. The use of this technique will not however affect the problem of pick-up.

The other technique previously employed with television cameras not incorporating an image intensifier has involved the use of the 'guard ring' principle. The target of the camera tube is encircled by a guard ring which is driven from a point in the video amplifier providing a signal voltage equal in magnitude and phase with the signal produced at the target. In this way the target is effectively decoupled from ground, the capacitance to ground of the target being replaced with what would be a larger capacitance between target and guard ring if it were not for the connection between these two integers.

SUMMARY OF THE INVENTION

It is therefore the object of this invention to adapt this guard ring principle to alleviate the capacitative problems introduced by bringing an image intensifier into close proximity with the target of a television camera tube. According to the invention the phosphor is caused to act somewhat like a conventional guard ring. It may optionally be accompanied by a separate genuine guard ring in which case the genuine guard ring and the phosphor are conveniently held at a common potential.

The gain provided by an image intensifier depends upon the potential difference developed across it. Therefore since the phosphor potential is required to float it might be throught that the power supply for the image intensifier ought to be tied to this floating potential rather than being referred to ground. It is however now necessary to float the power supply because the normal fluctuations in potential of the target are very small compared with one volt, and therefore these fluctuations are quite insignificant in comparison with the normal operating potential across an image intensifier, which is typically in the range 5 – 45 kV, depending upon the number of stages. If however the power supply is grounded, the video amplifier must present a fairly low impedance to direct current because the current flowing through the image intensifier will also have to flow through the amplifier.

According to the present invention there is provided a low light level television camera including a video amplifier and a television camera tube having a photoconductive target fiber-optically coupled to the output phosphor of an image intensifier, wherein the phosphor is connected to a point in the video amplifier adapted to provide a voltage signal equal in magnitude and phase to the voltage signal produced at the target. There follows a description of a part of the circuitry of a television camera embodying the invention in a preferred form.

BRIEF DESCRIPTION OF THE DRAWING

The FIGURE schematically shows a diagram of part of the camera circuit including the image intensifier and power supply together with part of camera tube and the first part of the video amplifier.

DESCRIPTION OF THE PREFERRED EMBODIMENT

As shown in the FIGURE, a single stage image intensifier 1, having a photocathode 2 and a phosphor 3, is coupled by a fiber optical plate 3a to the photoconductive target 4 of a television camera tube 5 having a fiber-optic face plate 6. The target 4 may be encircled by a guard ring 7, and a direct electrical connection is made between this guard ring and the phosphor 3.

The photocathode 2 is held at a large negative potential by means of a voltage multiplier 8 powered by an oscillator 9. The image intensifier may optionally be provided with a measure of automatic brightness control by arranging for the oscillator 9 to be fed from a current limiting supply.

The target of the camera is held at a negative potential by a target voltage supply (not shown) and the target signal output provided by scanning the target with an electron beam within the tube in a known manner is a.c. coupled to an FET input amplifying stage 10 having a transistor load 11. This amplifying stage is followed by a conventional transistor amplifying stage 12. By means of a potential divider network formed by resistors 13 and 14 a proportion of the output of this second amplifying stage 12 is fed to the guard ring 7 and phosphor 3. The output of the amplifying stage is in phase with the target signal output, and the values of the resistors 13 and 14 are chosen so that the magnitude of the proportion of this output which is fed to the guard ring and phosphor is equal to that of target signal output.

It may be noted that there will be a steady component of potential on the guard ring and the phosphor which is not the same as that on the target provided by the target voltage supply. In those types of camera having a target whose gamma is unity there is no occasion to vary the target supply voltage, and hence the potential difference between the phosphor and the target will be fixed. In other types of camera having a target whose gamma differs from unity, provision is normally made for varying the target supply voltage, either manually or automatically, to adjust the camera gain to match changes in level of mean intensity of illumination. If the target supply voltage is variable it is neither particularly convenient nor necessary to arrange for the phosphor potential to follow these variations. In the above described circuit the potential difference between the phosphor and the target will not fluctuate with the target signal but will change at the much slower rate at which changes in target supply voltage are made.

The circuitry described above is not substantially changed if the single stage image intensifier is replaced by either a two stage or a three stage image intensifier. The connections to intermediate photocathodes and phosphors in such image intensifiers are made in the conventional way to intermediate points in the voltage multiplier. The voltage multiplier has, of course, to be composed of more sections in order to provide the greater voltages required. Automatic brightness control may be achieved in the same manner as described above of limiting the current input to the oscillator. Alternatively it may be achieved by methods substantially as described in U.S. Pat. No. 3,694,659, issued Sept. 26, 1972 and assigned to the same assignee as the instant application, which rely upon monitoring the power dissipation in or current flow through the final stage of the image intensifier.

Neither is the circuitry described above substantially changed if the single stage image intensifier is replaced by a channel plate image intensifier. In this case automatic brightness control may be achieved by monitoring the power dissipation in or current flow through the phosphor.

It is to be understood that the foregoing description of specific examples of this invention is made by way of example only and is not to be considered as a limitation on its scope.

What is claimed is:

1. A low light level television camera system comprising a video amplifier, a television camera tube having a photoconductive target at one end connected to provide an output voltage signal to said video amplifier, an image intensifier tube having an output phosphor screen, and fiber optic means coupling said phosphor screen to said target, said phosphor screen being connected to a point in said video amplifier providing a feedback voltage signal equal in magnitude and phase to said output voltage signal from said target and being at a predetermined direct voltage with respect to a reference potential.

2. The television camera system of claim 1 wherein a guard ring is disposed around said camera tube adjacent said target and is connected to said point in said video amplifier providing said feedback voltage signal equal in magnitude and phase to said output voltage signal from said target, and said image intensifier output phosphor screen is at a fixed potential with respect to said camera tube target.

3. A television camera as claimed in claim 2 wherein said phosphor screen and guard ring are connected together at a common direct voltage.

* * * * *